Patented Apr. 18, 1939

2,155,356

UNITED STATES PATENT OFFICE 2,155,356

N-SUBSTITUTED-2-AMINO NITRO-PHENOLS

Edgar C. Britton and Clarence L. Moyle, Midland, Mich., assignors to The Dow Chemical Company, Midland, Mich., a corporation of Michigan No Drawing. Application June 17, 1937,
Serial No. 148,735

4 Claims. (Cl. 260—566)

This invention relates to 2-substituted nitro- and dinitro-phenols having the formula

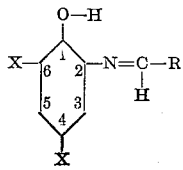

wherein one X represents the nitro group, the other X represents hydrogen or a nitro group, and R represents an organic residue selected from the group consisting of hydrogen and the aromatic, aliphatic, and aralkyl residues. These compounds may be considered as derivatives of nitrated ortho-aminophenol.

One method for the preparation of our new compounds involves condensing 2-amino-4-nitro-, -6-nitro-, or -4,6-dinitro-phenol with an aldehyde, suitable examples of which include formaldehyde, aldol, acetaldehyde, butyraldehyde, benzaldehyde, cinnamaldehyde, salicylaldehyde, phenyl acetaldehyde, hippuric aldehyde, etc. The reaction is carried out by dropping the aldehyde into a vessel containing the nitro-aminophenol compound, either in molten form or dissolved in an inert solvent. Reaction temperatures of from 30° to 90° C. are usually satisfactory, and an alkaline reaction medium is desirable. An atmosphere of carbon dioxide facilitates the reaction.

The following examples illustrate the practice of our invention, but are not to be construed as limiting the same:—

Example 1

10 grams (0.05 mol) of picramic acid (2-amino-4,6-dinitro-phenol) was dissolved in 450 milliliters of approximately 30 per cent ethanol in which had previously been dissolved 5.1 grams of sodium hydroxide. This solution was vigorously agitated while an equivalent amount of salicylaldehyde (6.1 grams, 0.05 mol) was added. The reaction mixture was placed in a thermostatically controlled oven where it was left overnight at 75° C. The reaction mixture was then acidified, whereupon an orange-colored solid precipitated. This product was filtered, washed, dried, and weighed 13.8 grams, representing 90.7 per cent of the theoretical yield. It had a melting point of 245.5°–248° C. and contained 13.44 per cent nitrogen. The theoretical nitrogen content of N-salicylidene picramic acid is 13.87 per cent. The formula of this compound is

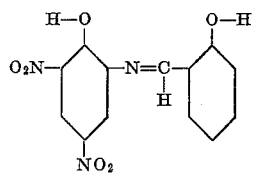

Example 2

In a similar manner 3,5-dinitro-salicylaldehyde was reacted with picramic acid. When the alkaline reaction mixture was acidified there was obtained as the principal product a red-brown crystalline material having a melting point of 225° to 227° C. This compound contained 17.36 per cent nitrogen. The calculated nitrogen content of N-(3,5-dinitro-salicylidene)-picramic acid is 17.81 per cent.

Example 3

Cinnamic aldehyde was reacted with picramic acid to produce a red, powdery material melting in the range between 198° and 201° C. This compound contained 13.4 per cent nitrogen, which is the theoretical nitrogen content of N-cinnamylidene-picramic acid, the formula of which is

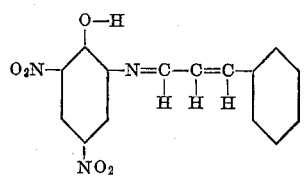

In a manner analogous to that described in the foregoing examples, butyraldehyde was reacted with picramic acid and with 2-amino-4-nitro-phenol and 2-amino-6-nitro-phenol. The products obtained from a large number of reactions between various aldehydes and nitro-ortho-aminophenols varied in color from a bright yellow to a dark red and in physical properties from mobile liquids to high melting solids.

It is seen that the organic radical attached to the aldehyde residue which has been coupled with the amino nitrogen atom in our new compounds may be a substituted aromatic, aliphatic, or aralkyl residue, such as the hydroxy-phenyl-, or dinitro-phenyl-residue, as well as the typical unsubstituted aryl, alkyl, and aralkyl radicals, such as the phenyl-ethyl radical.

Our new compounds may be reduced to form secondary amino compounds. Our new compounds and their reduction products may be employed as insecticides or as intermediates in the preparation of dyes.

Other modes of applying the principle of our invention may be employed instead of those explained, change being made as regards the compounds herein disclosed, provided the compounds stated by any of the following claims be obtained.

We therefore particularly point out and distinctly claim as our invention:

1. A new compound having the formula

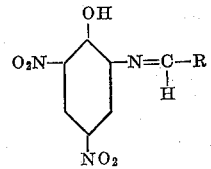

wherein R is the residue of an aldehyde selected from the group consisting of aldehydes of the benzene, lower saturated aliphatic, and phenyl lower aliphatic series.

2. N-salicylidene picramic acid.
3. N-(3,5-dinitro-salicylidene)-picramic acid.
4. N-cinnamylidene picramic acid.

EDGAR C. BRITTON.
CLARENCE L. MOYLE.